(12) United States Patent
Sexton

(10) Patent No.: US 12,707,301 B2
(45) Date of Patent: Aug. 11, 2026

(54) DEVICES AND METHODS FOR PREDICTING A MOBILE NETWORK EXPERIENCE

(71) Applicant: HUAWEI TECHNOLOGIES CO., LTD., Shenzhen (CN)

(72) Inventor: Kieran Sexton, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 18/364,518

(22) Filed: Aug. 3, 2023

(65) Prior Publication Data

US 2023/0379737 A1 Nov. 23, 2023

Related U.S. Application Data

(63) Continuation of application No. PCT/EP2021/052729, filed on Feb. 5, 2021.

(51) Int. Cl.
*H04W 24/08* (2009.01)
*H04L 41/147* (2022.01)
*H04L 41/16* (2022.01)

(52) U.S. Cl.
CPC ........... *H04W 24/08* (2013.01); *H04L 41/147* (2013.01); *H04L 41/16* (2013.01)

(58) Field of Classification Search
CPC ....... H04W 24/08; H04L 41/147; H04L 41/16
(Continued)

(56) References Cited

U.S. PATENT DOCUMENTS 11,063,842 B1 * 7/2021 Vasseur ................ G06N 3/0895
2018/0206136 A1 7/2018 Chow et al.
(Continued)

FOREIGN PATENT DOCUMENTS

AU 2020100709 A4 6/2020
CN 105554782 B 1/2019
(Continued)

OTHER PUBLICATIONS

ETSI TR 103 559 V1.1.1 (Aug. 2019), Technical Report, “Speech and multimedia Transmission Quality (STQ); Best practices for robust network QoS benchmark testing and scoring,” 33 total pages.
(Continued)

*Primary Examiner* — Nicholas R Taylor
*Assistant Examiner* — Chong G Kim
(74) *Attorney, Agent, or Firm* — Rimon PC

(57) ABSTRACT

The present disclosure relates to a device for predicting a mobile network experience. In an inference phase, the device obtains network Key Performance Indicator (KPI) data for the mobile network by executing a set of test procedures using a mobile application on a mobile device in the mobile network, obtains a trained machine learning model and feeds it with the network KPI data, and estimates, using the trained machine learning model, a network experience score for the mobile application based on the network KPI data. The disclosure also presents a device that, in a training phase, obtains training data, calculates a set of network experience scores for a mobile application, based on the training data, obtains network KPI data for the mobile network, and generates a database comprising the set of network experience scores of the mobile application.

12 Claims, 7 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 2018/0270126 | A1 | 9/2018 | Tapia | |
| 2019/0097909 | A1 | 3/2019 | Puri et al. | |
| 2019/0158564 | A1 | 5/2019 | Wang et al. | |
| 2019/0246298 | A1* | 8/2019 | Roman | H04W 24/08 |
| 2020/0329386 | A1* | 10/2020 | Perez-Ramirez | H04L 41/16 |
| 2021/0112441 | A1* | 4/2021 | Sabella | H04W 40/18 |
| 2022/0210682 | A1* | 6/2022 | Kulkarni | H04L 41/16 |

FOREIGN PATENT DOCUMENTS

| | | | |
|---|---|---|---|
| CN | 111083743 | A | 4/2020 |
| CN | 110474786 | B | 5/2022 |
| CN | 110797046 | B | 5/2022 |
| CN | 110365503 | B | 8/2022 |
| WO | 2017157171 | A1 | 9/2017 |

OTHER PUBLICATIONS

ETSI TR 101 578 V1.3.1 (Oct. 2018), Technical Report, “Speech and multimedia Transmission Quality (STQ); QoS aspects of TCP-based video services like YouTubeTM,” 24 total pages.

ETSI TS 102 250-2 V2.4.1 (May 2015), Technical Specification, “Speech and multimedia Transmission Quality (STQ); QoS aspects for popular services in mobile networks; Part 2: Definition of Quality of Service parameters and their computation,” 258 total pages.

* cited by examiner

DEVICES AND METHODS FOR PREDICTING A MOBILE NETWORK EXPERIENCE

CROSS-REFERENCE TO RELATED APPLICATIONS

This application is a continuation of International Patent Application No. PCT/EP2021/052729, filed on Feb. 5, 2021, the disclosure of which is hereby incorporated by reference in its entirety.

TECHNICAL FIELD

The present disclosure relates generally to the field of communication networks, and particularly to the prediction of a network experience for a mobile application using a mobile service in a mobile network.

To this end, a device is disclosed that, in an inference phase, may use a trained machine learning model for estimating a network experience score. The disclosure also presents a device that, in a training phase, may generate a database comprising a set of network experience scores of a mobile application, and may further train a machine learning model for the mobile application based on the generated database.

BACKGROUND

Conventionally, a network experience is calculated from Quality of Service (QoS) parameters, which are collected or predicted from accessible applications. Moreover, the network experience that is calculated based on conventional methods may rely on measurements and statistics from applications that represent a subscriber's use, and are measured through applications, for example, with open Application Programming Interface (APIs) or through a partnership with an application development organization.

Furthermore, the network experience score and grade are then calculated based on the QoS parameters and a scoring methodology.

However, an issue of conventional devices and methods is that the network experience measurements are limited to accessible applications. Moreover, selecting applications that will be representative of a subscriber's use or limiting testing to accessible applications will not accurately reflect the network experience.

Furthermore, another issue of conventional devices and methods is that it is not practical to partner with the many and varied application development organisations to capture application events. Moreover, there is a high cost to partnering which takes time to develop and effort to manage.

SUMMARY

In view of the above-mentioned problems and disadvantages, embodiments of the present disclosure aim to improve conventional devices and methods. An objective is to provide a device and a method that, in an inference phase, predicts a network experience directly from network Key Performance Indicator (KPI) data. Another objective is to provide a device and a method that, in a training phase, trains a machine learning model for predicting a network experience directly from network KPI data.

The devices and methods of the present disclosure should be able to determine the network experience for the many applications using mobile services in industries enabled through Fifth Generation (5G) mobile network. These applications may use proprietary encrypted protocols for communication. Therefore, is may not be possible to access events to measure the subscriber experience of using services through these applications on a mobile network.

The objective is achieved by the embodiments of the disclosure as described in the enclosed independent claims. Advantageous implementations of the embodiments of the disclosure are further defined in the dependent claims.

In particular, the devices and methods according to embodiments of the present disclosure are configured to use a machine learning model to determine a network experience score and a grade for mobile network applications with proprietary encrypted protocols where the application events are not accessible.

A first aspect of the present disclosure provides a device for predicting a mobile network experience, the device being configured to, in an inference phase, obtain network KPI data for the mobile network by executing a set of test procedures using one or more mobile applications on one or more mobile devices in the mobile network, obtain a trained machine learning model and feed it with the network KPI data, and estimate, using the trained machine learning model, a network experience score for at least one mobile application from the one or more mobile applications based on the network KPI data.

The device may be, or may be incorporated within, an electronic device such as a personal computer, a server computer, a client computer, a laptop and a notebook computer, a tablet device, etc.

For example, during the inference phase, the device may obtain the KPI data and the trained machine learning model. Moreover, the device may estimate, using the trained machine learning model, the network experience score for the at least one mobile application based on the network KPI data. The device may obtain the network KPI data during the execution of the test procedure, for example, the network KPI data may be obtained from the mobile network itself, whilst using an application, and not from the application.

The device of the present disclosure may reduce the time and cost of drive testing. For example, the device of the first aspect may estimate the network experience score directly from the KPI data. Hence, a cost and time related to predicting the QoS parameter output used by conventional devices for predicting the network experience score may be reduced or eliminated.

Furthermore, the device of the first aspect may estimate the network experience score for applications that may be encrypted, as their events may not be accessible by the device.

The device may comprise +circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

In an implementation of the first aspect, the device is further configured to estimate, using the trained machine learning model, a network experience grade for the at least one mobile application from the one or more mobile applications based on the network KPI data.

For example, the device of the first aspect may estimate the network experience grade directly from the KPI data.

In a further implementation of the first aspect, obtaining the trained machine learning model comprises obtaining a first trained machine learning model and a second trained machine learning model for each mobile service of the one or more mobile applications; and wherein the device is further configured to estimate, using the first trained machine learning model, the network experience score for the at least one mobile application and/or estimate, using the second trained machine learning model, the network experience grade for the at least one mobile application.

In particular, if the mobile applications represent different mobile network services, then the device may obtain a machine learning model per each mobile service. For instance, the device may obtain two types of machine learning models, one type (regression) for estimating network experience scores and one type (classification) for estimating network experience grades, but there may be multiple models, one per service depending on the scoring methodology.

In a further implementation of the first aspect, the first trained machine learning model is based on a random forest machine learning model, in particular a regression model and/or the second trained machine learning model is based on a random forest machine learning model, in particular a classification model.

In a further implementation of the first aspect, the at least one mobile application is based on an encrypted protocol, providing an event that is not accessible to the device.

A second aspect of the disclosure provides a device for predicting a mobile network experience, the device being configured to, in a training phase, obtain training data by running a set of test procedures using one or more mobile applications on one or more mobile devices in the mobile network, calculate a set of network experience scores for at least one mobile application from the one or more mobile applications, based on the obtained training data, obtain network KPI data for the mobile network based on the set of test procedures, and generate a database comprising the set of network experience scores of the at least one mobile application, each network experience score being associated with a part of the network KPI data of the mobile network.

The device may be, or may be incorporated within, an electronic device such as a personal computer, a server computer, a client computer, a laptop and a notebook computer, a tablet device, etc.

For example, during the training phase, the device may obtain training data by running the set of test procedures using mobile applications that are not based on an encrypted protocol, i.e., the application events are accessible to the device. Moreover, the device may calculate the network experience scores from the QoS parameter data collected from the application in the training phase. Furthermore, the network experience scores may be collected and stored in the database, in the training phase to train a machine learning model.

In an implementation of the second aspect, the device is further configured to calculate a set of network experience grades for the at least one mobile application, based on the obtained training data, and wherein the database further comprises the set of network experience grades of the at least one mobile application, each network experience grade being associated with a part of network KPI data of the mobile network.

In a further implementation of the second aspect, the device is further configured to train a first machine learning model and a second machine learning model for the at least one mobile application based on the generated database.

In a further implementation of the second aspect, the first machine learning model is based on a random forest machine learning model, in particular a regression model, and the device is further configured to train the regression model based on feeding it with the calculated set of network experience scores, each network experience score being calculated based on a QoS parameter of the training data and associated with the part of the network KPI data of the mobile network, according to the database.

In a further implementation of the second aspect, the second machine learning model is based on a random forest machine learning model, in particular a classification model, and the device is further configured to train the classification model based on feeding it with the calculated set of network experience grades, each network experience grade being calculated based on the calculated network experience score and associated with the part of the network KPI data of the mobile network, according to the database.

In a further implementation of the second aspect, the one or more applications comprise a mobile service and are based on accessible applications providing an accessible event to the device.

In a further implementation of the second aspect, the set of test procedures comprises a user interaction comprising one or more of:

- a web browsing procedure,
- a video playing procedure,
- a social media uploading procedure,
- a social media downloading procedure,
- a virtual reality procedure,
- an augmented reality procedure,
- a cloud game procedure, and
- an entertainment procedure.

In a further implementation of the second aspect, the training data for the mobile service comprises one or more of:

- a QoS parameter for an accessibility of the at least one mobile application,
- a QoS parameter for a retain-ability of the at least one mobile application,
- a QoS parameter for a quality of the at least one mobile application,
- a minimum value of an allowed network experience score, and
- a maximum value of an allowed network experience score.

In a further implementation of the second aspect, the network KPI data comprises one or more of:

- latency data,
- packet loss data,
- delay variance data,
- jitter data,
- a data rate,
- bandwidth data,
- reference signal receive power data,
- a signal-to-interference-plus-noise ratio data,
- a round trip time.

In a further implementation of the second aspect, each network experience score has a non-negative integer value.

In a further implementation form of the second aspect, each network experience grade is one of:

- an outstanding grade,
- a very good grade,
- a good grade,
- a satisfactory grade, and
- a sufficient grade.

A third aspect of the disclosure provides a method for predicting a mobile network experience, the method comprising, in an inference phase, obtaining network KPI data for the mobile network by executing a set of test procedures using one or more mobile applications on one or more mobile devices in the mobile network, obtaining a trained machine learning model and feeding it with the network KPI data, and estimating, by the trained machine learning model, a network experience score for at least one mobile application from the one or more mobile applications based on the network KPI data.

In an implementation of the third aspect, the method further comprises estimating, using the trained machine learning model, a network experience grade for the at least one mobile application from the one or more mobile applications based on the network KPI data.

In a further implementation of the third aspect, obtaining the trained machine learning model comprises obtaining a first trained machine learning model and a second trained machine learning model for each mobile service of the one or more mobile applications; and wherein the method further comprises estimating, using the first trained machine learning model, the network experience score for the at least one mobile application and/or estimate, using the second trained machine learning model, the network experience grade for the at least one mobile application.

In a further implementation of the third aspect, the first trained machine learning model is based on a random forest machine learning model, in particular a regression model and/or the second trained machine learning model is based on a random forest machine learning model, in particular a classification model.

In a further implementation of the third aspect, the at least one mobile application is based on an encrypted protocol, providing an event that is not accessible to the device.

The method of the third aspect achieves the advantages and effects described for the device of the first aspect.

A fourth aspect of the disclosure provides a method for predicting a mobile network experience, the method comprising, in a training phase, obtaining training data by running a set of test procedures using one or more mobile applications on one or more mobile devices in the mobile network, calculating a set of network experience scores for at least one mobile application from the one or more mobile applications, based on the obtained training data, obtaining network KPI data for the mobile network based on the set of test procedures, and generating a database comprising the set of network experience scores of the at least one mobile application, each network experience score being associated with a part of the network KPI data of the mobile network.

In an implementation of the fourth aspect, the method further comprises calculating a set of network experience grades for the at least one mobile application, based on the obtained training data, and wherein the database further comprises the set of network experience grades of the at least one mobile application, each network experience grade being associated with a part of the network KPI data of the mobile network.

In a further implementation of the fourth aspect, the method further comprises training a first machine learning model and a second machine learning model for the at least one mobile application based on the generated database.

In a further implementation form of the fourth aspect, the first machine learning model is based on a random forest machine learning model, in particular a regression model, and the method further comprises training the regression model based on feeding it with the calculated set of network experience scores, each network experience score being calculated based on a QoS parameter of the training data and associated with the part of the network KPI data of the mobile network, according to the database.

In a further implementation of the fourth aspect, the second machine learning model is based on a random forest machine learning model, in particular a classification model, and the method further comprises training the classification model based on feeding it with the calculated set of network experience grades, each network experience grade being calculated based on the calculated network experience score and associated with the part of the network KPI data of the mobile network, according to the database.

In a further implementation of the fourth aspect, the one or more applications comprise a mobile service and are based on accessible applications providing an accessible event to the device.

In a further implementation of the fourth aspect, the set of test procedures comprises a user interaction comprising one or more of:

a web browsing procedure,
a video playing procedure,
a social media uploading procedure,
a social media downloading procedure,
a virtual reality procedure,
an augmented reality procedure,
a cloud game procedure, and
an entertainment procedure.

In a further implementation of the fourth aspect, the training data for the mobile service comprises one or more of:

a QoS parameter for an accessibility of the at least one mobile application,
a QoS parameter for a retain-ability of the at least one mobile application,
a QoS parameter for a quality of the at least one mobile application,
a minimum value of an allowed network experience score, and
a maximum value of an allowed network experience score.

In a further implementation of the fourth aspect, the network KPI data comprises one or more of:

latency data,
packet loss data,
delay variance data,
jitter data,
a data rate,
bandwidth data,
reference signal receive power data,
a signal-to-interference-plus-noise ratio data, and
a round trip time.

In a further implementation of the fourth aspect, each network experience score has a non-negative integer value.

In a further implementation form of the fourth aspect, each network experience grade is one of:

an outstanding grade,
a very good grade,
a good grade,
a satisfactory grade, and
a sufficient grade.

The method of the fourth aspect achieves the advantages and effects described for the device of the second aspect.

A fifth aspect of the present disclosure provides a computer program comprising a program code for performing the method according to the third aspect or the fourth aspect or any of their implementations.

A sixth aspect of the present disclosure provides a non-transitory storage medium storing executable program code which, when executed by a processor, causes the method according to the third aspect or the fourth aspect any of their implementation forms to be performed.

It has to be noted that the devices, elements, units and means described in the present application could be implemented in software or hardware elements or any kind of combination thereof. The steps which are performed by the various entities described in the present application, as well as the functionalities described to be performed by the various entities, are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
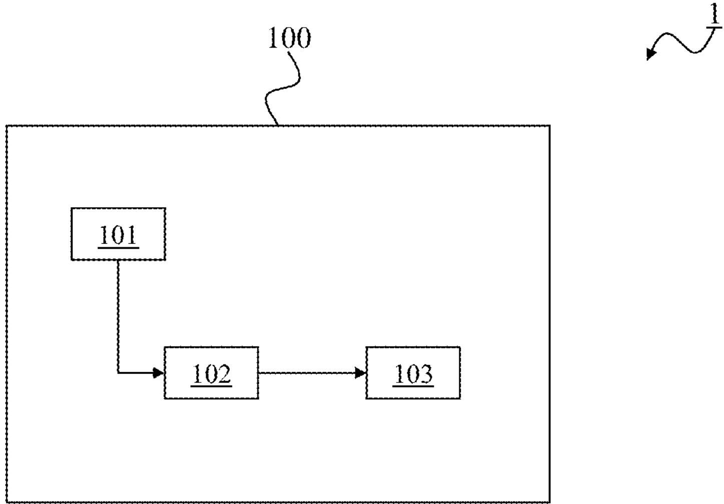
FIG. 1 depicts a schematic view of a device for predicting a mobile network experience, according to an embodiment of the disclosure.

FIG. 1 depicts a schematic view of a device 100 for predicting a mobile network experience, according to an embodiment of the disclosure.

The device 100 may be, for example, an electronic device such as a computer.

The device 100 is configured to, in an inference phase, obtain network Key Performance Indicator (KPI) data 101 for the mobile network 1 by executing a set of test procedures using one or more mobile applications on one or more mobile devices in the mobile network 1.

The device 100 is further configured to, in the inference phase, obtain a trained machine learning model 102 and feed it with the network KPI data 101.

The device 100 is further configured to, in the inference phase, estimate, using the trained machine learning model 102, a network experience score 103 for at least one mobile application from the one or more mobile applications based on the network KPI data 101.

The device 100 may comprise processing circuitry (not shown) configured to perform, conduct, or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 100 to perform, conduct or initiate the operations or methods described herein.

Figure 2:
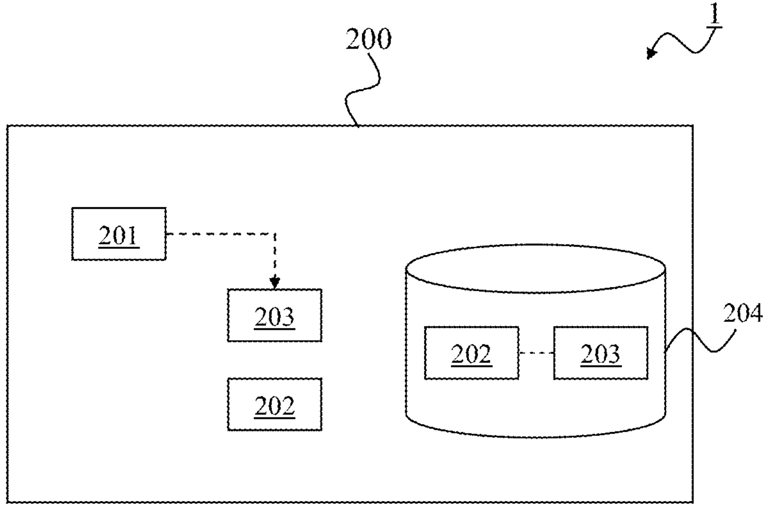
FIG. 2 depicts a schematic view of a device for predicting a mobile network experience, according to an embodiment of the disclosure.

FIG. 2 depicts a schematic view of a device 200 for predicting a mobile network experience, according to an embodiment of the disclosure.

The device 200 may be, for example, an electronic device such as a computer.

The device 200 is configured to, in a training phase, obtain training data 201 by running a set of test procedures using one or more mobile applications on one or more mobile devices in the mobile network 1.

The device 200 is further configured to, in the training phase, calculate a set of network experience scores 203 for at least one mobile application from the one or more mobile applications, based on the obtained training data 201.

The device 200 is further configured to, in the training phase, obtain network KPI data 202 for the mobile network 1 based on the set of test procedures.

The device 200 is further configured to, in the training phase, generate a database 204 comprising the set of network experience scores 203 of the at least one mobile application, each network experience score 203 being associated with a part of network KPI data 202 of the mobile network 1.

The device 200 may comprise processing circuitry (not shown) configured to perform, conduct, or initiate the various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device 200 to perform, conduct, or initiate the operations or methods described herein.

Figure 3:
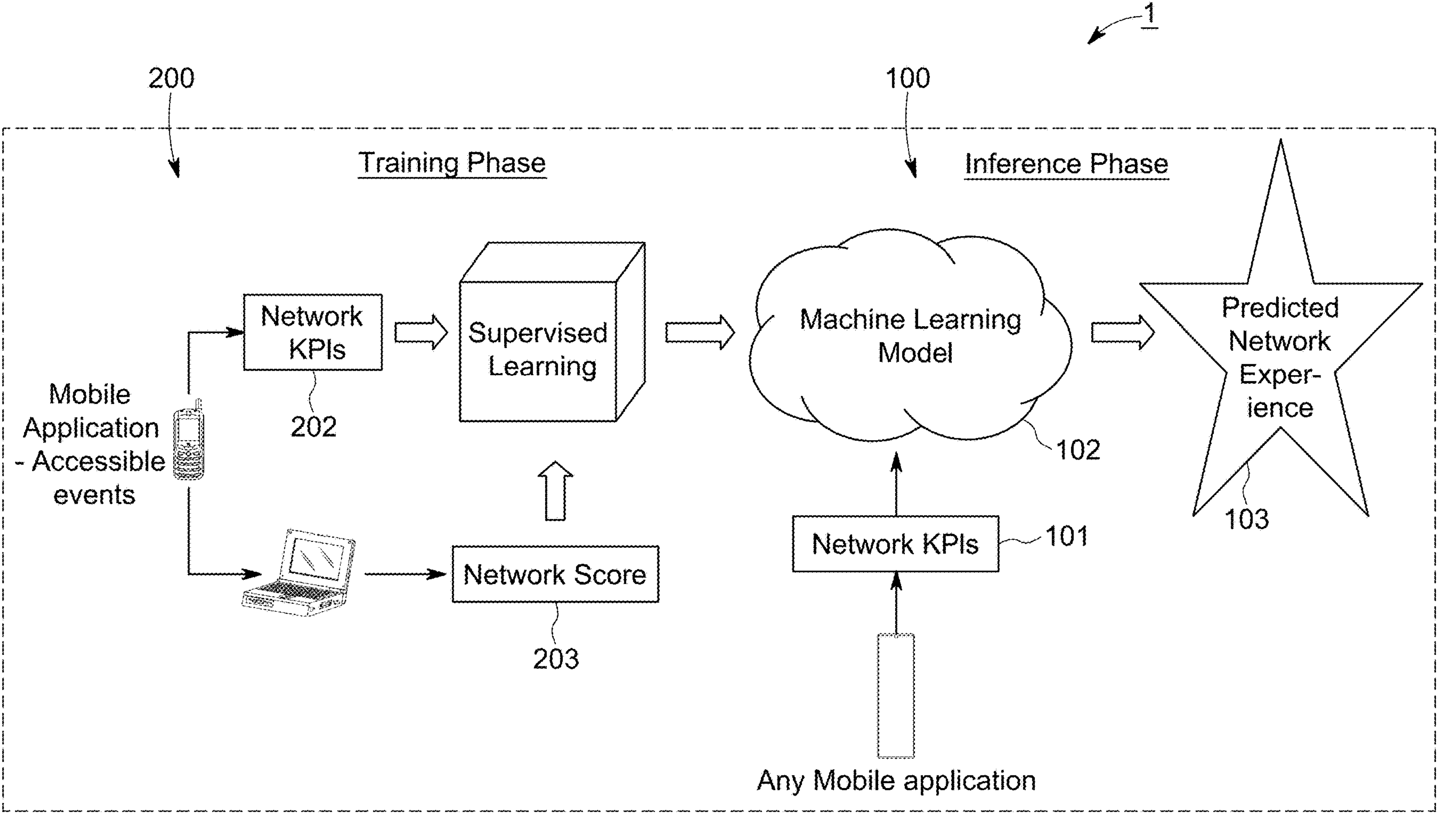
FIG. 3 depicts a schematic view of the mobile network comprising the device of FIG. 1 and the device of FIG. 2, according to an embodiment of the disclosure.

Reference is now made to FIG. 3 which is a schematic view of the mobile network 1 comprising the device 100 and the device 200, according to an embodiment of the disclosure.

In particular, the device 200 may build a supervised machine learning model per service based on training data 201 from one accessible application, e.g., the device 200 may train the machine learning model to associate the network score 203 with a pattern of network KPIs 202.

Furthermore, the device 100 may use the machine learning model 102 to predict the network experience score 103 or the network experience grade of a subscriber for any application using that mobile service.

For example, the device 100 may predict the network experience score 103 and the network experience grade for any application. Furthermore, the grade e.g., ranging from satisfactory to outstanding, is universally clear. The network experience score 103 e.g., a number is more useful for mobile network testers, optimization engineers etc.

The device 100 and/or the device 200 may enable predicting a network experience. Moreover, the prediction of a network experience score and grade for mobile applications may be performed, without the need to access the application measurements or events. Prediction may be based on a machine learning model that has learned the pattern of network KPI data 202 for a particular network experience score and grade. Once the machine learning model is created, it may determine, based on the KPI data alone, a predicted network experience for that application on a particular mobile network.

The network experience score and grade may be a value from 0 to x and may be suitable for drive testing and optimization engineers (Note: x is dependent on the maximum score for the service in the scoring methodology).

Further, the network experience grade is one of outstanding, very good, good, satisfactory, sufficient and suitable for customer care, operations and management reports.

The device 100 and/or the device 200 may provide the following advantages:

Ability to test and compare applications without a need to access proprietary encrypted protocols or develop costly partnerships.

Removes uncertainty in selecting/deciding which is the most representative application for a service to measure a network experience.

Test many applications across many use cases and services.

Better representation of network performance as experienced by the user.

Experiment with network parameters to predict an application experience or connectivity requirements.

Figure 4:
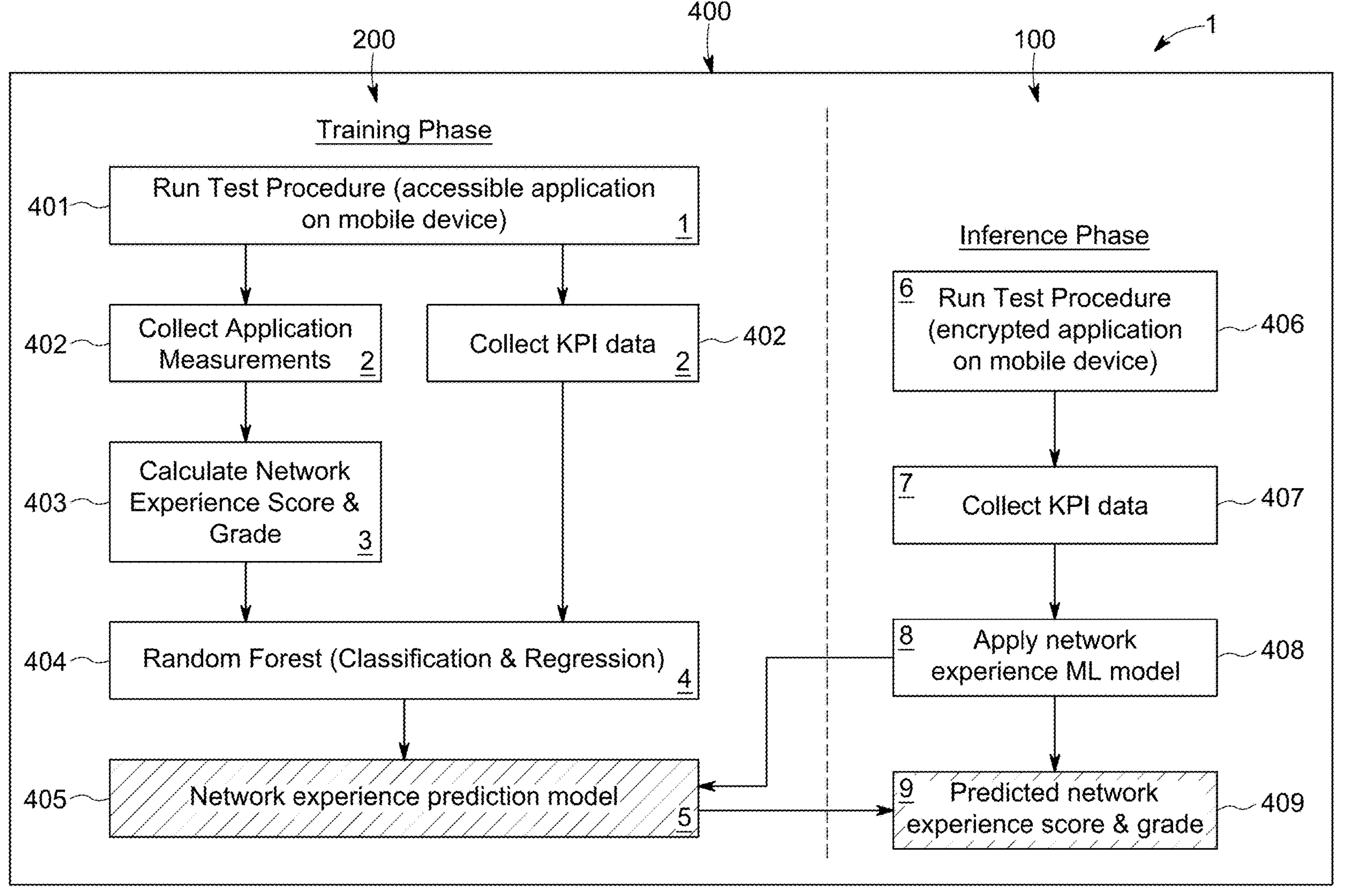
FIG. 4 depicts a schematic view of a flow chart of a procedure for training a machine learning model and predicting a network experience for a mobile application, according to an embodiment of the disclosure.

Reference is now made to FIG. 4 which is a schematic view of a flow chart of a procedure 400 for training a machine learning model and predicting a network experience for a mobile application, according to an embodiment of the disclosure.

The flowchart of the procedure 400 outlines the workflow in two phases:

- Training phase (Steps 401 to 405): building the supervised machine learning model using training data.
- Inference Phase (steps 406 to 409): applying the machine learning model to network data to predict network experience.

Training Phase: Steps 401 to 405

At 401, the device 200 may obtain training data 201 by running a set of test procedures using one or more mobile applications on one or more mobile devices in the mobile network 1.

The device 200 may execute test procedures using an accessible application. The test procedure may include: web browsing, video playing, social media uploads, cloud gaming, VR entertainment, retail, fitness, etc.

At 402, the device 200 may collect application measurements and may further obtain KPI data 202 for the mobile network based on the set of test procedures performed at 401.

The device 200 may collect test results per service i.e., QoS parameters for accessibility retain ability, quality, etc.

Moreover, the device 200 may collect network KPI data including but not limited to: latency, packet loss, delay variance, jitter, data rate, bandwidth, rsrp, sinr, and round trip time.

At 403, the device 200 may calculate a set of network experience scores 203 for the mobile application and may further calculate a set of network experience grades for the application.

At 404, the device 200 may train a first machine learning model and a second machine learning model for the mobile application.

For example, the device 200 may train a random forest machine learning algorithm.

The prediction range may be from highest to lowest labels in the training data. The min and max score in the training data may determine the range supported by the model.

Moreover, because there are different scoring limits for different services a model per service may be required.

At 405, the device 200 may obtain a network experience prediction model, i.e., the trained machine learning model.

Additionally, there is a location or geographical context to the network experience whereby the scoring and/or grading contains location information. For instance, depending on the location type, e.g., urban, rural etc., there may be a different scoring model.

Inference Phase Steps 406 to 409

At 406, the device 100 may execute a set of test procedures using one or more mobile applications on one or more mobile devices in the mobile network 1.

For example, the device 100 executes test procedures for any application. The test procedure may include web browsing, video playing, social media uploads, cloud gaming, VR entertainment, etc.

At 407, the device 100 may obtain network KPI data 101 for the mobile network 1.

For example, the device 100 may collect network KPI including but not limited to: latency, packet loss, delay variance, jitter, data rate, bandwidth, rsrp, sinr, and round trip time.

At 408, the device 100 may apply KPI data for the appropriate scoring service model and may further predict a network experience score for the mobile application.

At 409, the device 100 may apply network KPI data for the appropriate grading service model and may further predict network experience grade for this application.

Figure 5:
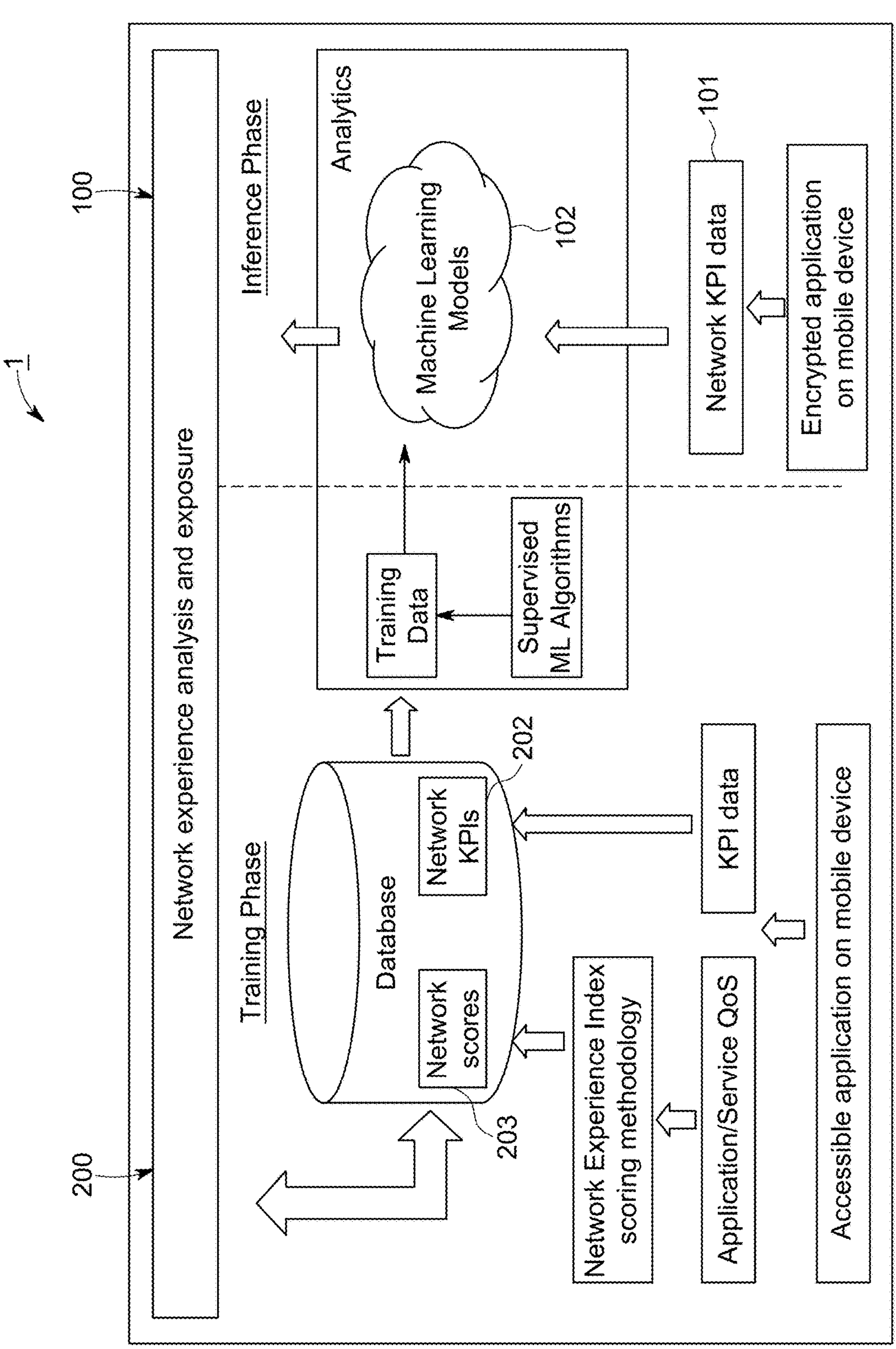
FIG. 5 depicts a schematic view of a diagram illustrating an exemplary component of the device of FIG. 1 and the device of FIG. 2, according to an embodiment of the disclosure.

Reference is now made to FIG. 5, which is a schematic view of a diagram illustrating an exemplary component of the device 100 and/or the device 200.

In particular, FIG. 5 shows a high level solution architecture that may include one or more of:

- Data generation component e.g., mobile device running application tests;
- Data collection component;
- Data processing component;
- Data storage component;
- Data Analytics component;
- Machine learning model; and
- Network experience analysis and exposure component.

Figure 6:
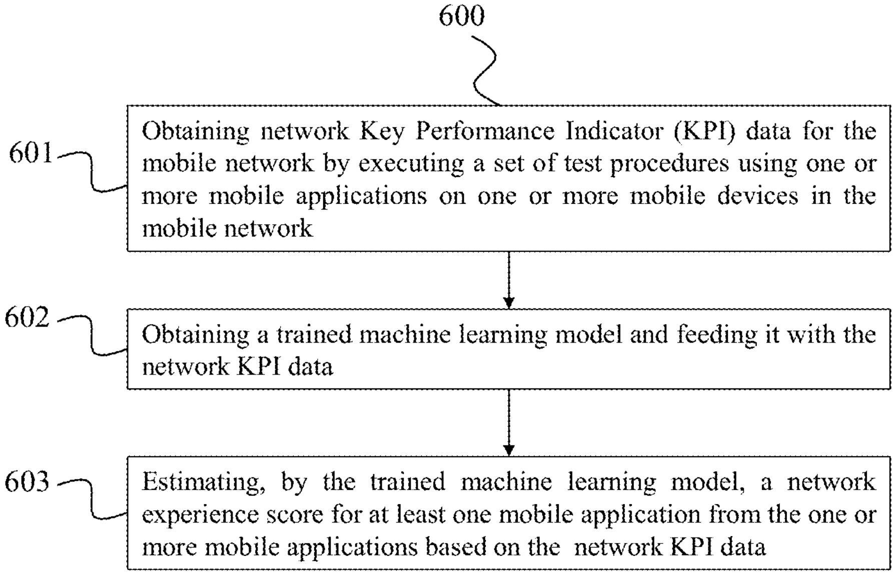
FIG. 6 depicts a flowchart of a method for predicting a mobile network experience, according to an embodiment of the disclosure.

FIG. 6 shows a method 600 according to an embodiment of the disclosure for predicting a mobile network experience. The method 600 may be carried out by the device 100, as it described above.

The method 600 comprises, in an inference phase, a step 601 of obtaining network Key Performance Indicator, KPI, data 101 for the mobile network 1 by executing a set of test procedures using one or more mobile applications on one or more mobile devices in the mobile network 1.

The method 600 further comprises, in the inference phase, a step 602 of obtaining a trained machine learning model 102 and feeding it with the network KPI data 101.

The method 600 further comprises, in the inference phase, a step 603 of estimating, by the trained machine learning model 102, a network experience score 103 for at least one mobile application from the one or more mobile applications based on the network KPI data 101.

Figure 7:
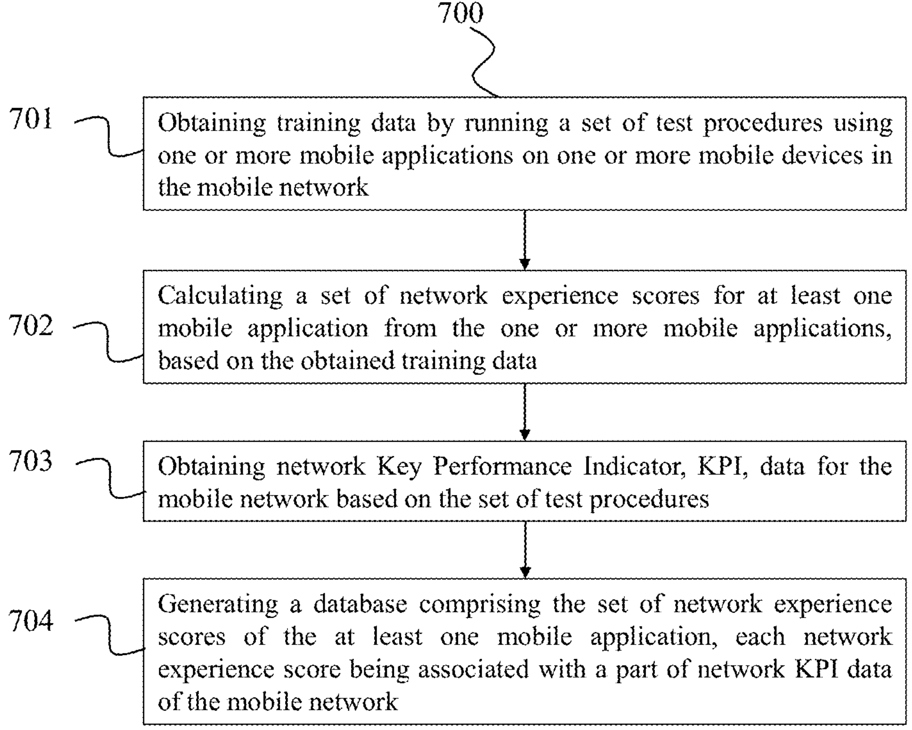
FIG. 7 depicts a flowchart of a method for predicting a mobile network experience, according to an embodiment of the disclosure.

FIG. 7 shows a method 700 according to an embodiment of the disclosure for predicting mobile network experience. The method 700 may be carried out by the device 200, as it described above.

The method 700 comprises, in a training phase, a step 701 of obtaining training data 201 by running a set of test procedures using one or more mobile applications on one or more mobile devices in the mobile network 1.

The method 700 further comprises, in the training phase, a step of calculating 702 a set of network experience scores 203 for at least one mobile application from the one or more mobile applications, based on the obtained training data 201.

The method 700 further comprises, in the training phase, a step 703 of obtaining network KPI data 202 for the mobile network 1 based on the set of test procedures.

The method 700 further comprises, in the training phase, a step 704 of generating a database 204 comprising the set of network experience scores of the at least one mobile application, each network experience score 203 being associated with a part of the network KPI data 202 of the mobile network 1.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for predicting a mobile network experience, the device comprising:

one or more processors and a non-volatile memory connected to the one or more processors, the non-volatile memory storing executable code which, when executed by the one or more processors, causes the device to obtain network Key Performance Indicator, KPI, data for the mobile network by executing a set of test procedures using one or more mobile applications on one or more mobile devices in the mobile network;

obtain a first trained machine learning model and a second trained machine learning model for each mobile service of the one or more mobile applications, wherein the first trained machine learning model is based on a regression model and the second trained machine learning model is based on a classification model;

feed the first and second trained machine learning models with the network KPI data; and estimate, based on the network KPI data and using the first trained machine learning model, a network experience score for at least one mobile application from the one or more mobile applications, and estimate, based on the network KPI data and using the second trained machine learning model, a network experience grade for the at least one mobile application in order to represent a network performance as experienced by a user.

2. The device according to claim 1, wherein:

the at least one mobile application is based on an encrypted protocol and provides an event that is not accessible to the device.

3. A method for predicting a mobile network experience, the method comprising:

in an inference phase:

obtaining network Key Performance Indicator, KPI, data for a mobile network by executing a set of test procedures using one or more mobile applications on one or more mobile devices in the mobile network;

obtaining a first trained machine learning model and a second trained machine learning model for each mobile service of the one or more mobile applications, wherein the first trained machine learning model is based on a regression model and the second trained machine learning model is based on a classification model;

feeding the first and second trained machine learning models it with the network KPI data; and estimating, by the first trained machine learning model and based on the network KPI data, a network experience score for at least one mobile application from the one or more mobile applications, and estimate, based on the network KPI data and using the second trained machine learning model, a network experience grade for the at least one mobile application in order to represent a network performance as experienced by a user.

4. The method according to claim 3, wherein:

the at least one mobile application is based on an encrypted protocol and provides an event that is not accessible.

5. The method according to claim 3, wherein the network experience score has a non-negative integer value.

6. The method according to claim 3, wherein the network experience grade is an outstanding grade, a very good grade, a good grade, a satisfactory grade, or a sufficient grade.

7. The device according to claim 1, wherein the network experience score has a non-negative integer value.

8. The device according to claim 1, wherein the network experience grade is an outstanding grade, a very good grade, a good grade, a satisfactory grade, or a sufficient grade.

9. A non-transitory storage medium comprising:

executable program code which, when executed by a processor, causes the processor to obtain network Key Performance Indicator, KPI, data for a mobile network by executing a set of test procedures using one or more mobile applications on one or more mobile devices in the mobile network;

obtain a first trained machine learning model and a second trained machine learning model for each mobile service of the one or more mobile applications, wherein the first trained machine learning model is based on a regression model and the second trained machine learning model is based on a classification model;

feed the first and second trained machine learning models with the network KPI data; and estimate, by the first trained machine learning model and based on the network KPI data, a network experience score for at least one mobile application from the one or more mobile applications, and estimate, based on the network KPI data and using the second trained machine learning model, a network experience grade for the at least one mobile application in order to represent a network performance as experienced by a user.

10. The non-transitory storage medium of claim 9 wherein the at least one mobile application is based on an encrypted protocol and provides an event that is not accessible.

11. The non-transitory storage medium of claim 9 wherein the network experience score has a non-negative integer value.

12. The non-transitory storage medium of claim 9, wherein the network experience grade is an outstanding grade, a very good grade, a good grade, a satisfactory grade, or a sufficient grade.

* * * * *